Dec. 21, 1965  E. B. WHITE  3,224,643
ARTICLE DISPENSER WITH NUTATING OVEN
Filed Dec. 9, 1964  2 Sheets-Sheet 2

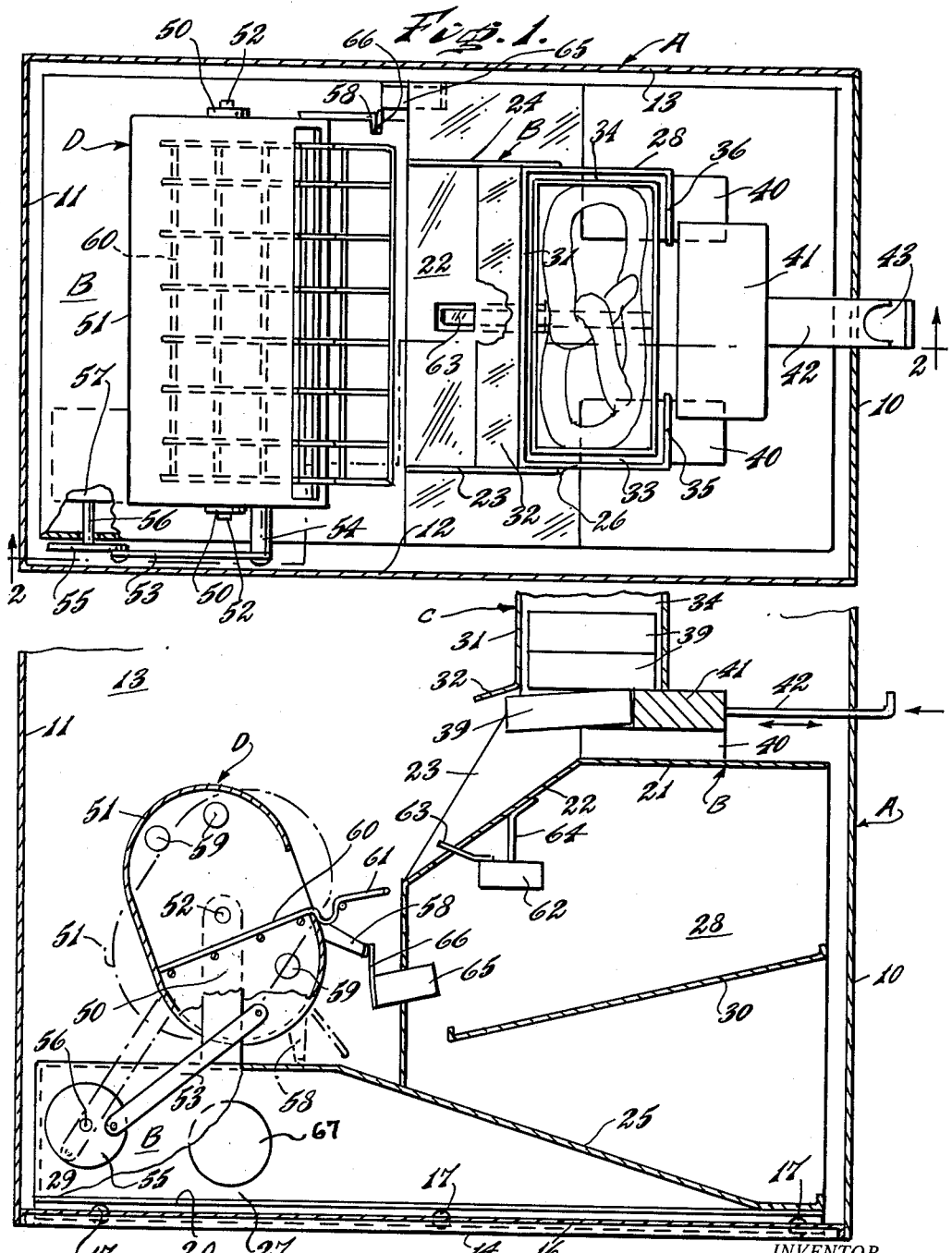

INVENTOR.
Edward B. White
BY Bilker + Moyerman.
ATTORNEYS

United States Patent Office 3,224,643
Patented Dec. 21, 1965

3,224,643
ARTICLE DISPENSER WITH NUTATING OVEN
Edward B. White, Philadelphia, Pa., assignor to
Synergistic Associates, Philadelphia, Pa.
Filed Dec. 9, 1964, Ser. No. 416,990
2 Claims. (Cl. 221—150)

This invention pertains to dispensers for edible articles which benefit, in terms of flavor, consistency, and the like from heating immediately prior to their consumption. More particularly, it pertains to a coin operated dispenser, for edible articles, which includes a nutating oven, said oven performing not only traditional heating functions but also serving as a means for transferring the article to be dispensed from one location to another.

There are many food products which benefit from heating prior to consumption. Well known examples include, for instance, soft pretzels, pizza, cinnamon buns, hot cross buns, doughnuts, waffles and the like. Ideally, these products are eaten while still warm and freshly baked. However, if the products must be dispensed some time after baking there is still great enhancement of flavor if they are heated prior to consumption. In most cases, there is no comparison between the flavor of such already baked products when warm and their flavor when cold.

Accordingly, it is an object of this invention to provide dispensers for such edible articles which include oven means for reheating them during the course of the dispensing operation.

A further object of the invention is to provide dispensers, of the type described, which include a nutating oven capable of receiving an article when it is in a first position, heating the article and, thereafter, transferring the article by assuming a second discharge position.

Still another object of the invention is to provide very inexpensive coin operated dispensing means which can be used for heating edible products without use of traditional equipment such as bulky ovens requiring manual attention and control.

It is also an object of the invention to provide dispensers containing a gravity feed magazine for holding a plurality of articles as well as coin operated means for discharging an edible product from the magazine into a nutating oven.

Other objects of the invention include the provision of control and operating devices for causing the nutating oven to be in a position to receive an article discharged from the magazine, at time of discharge, and to cause the oven to change its position so as to deliver the heated article to the user of the machine, followed by a return to the position where it awaits the next article to be dispensed.

The objects of the invention include the provision of improved article dispensers of the character described which are easily and economically produced, which are sturdy in construction, which have a minimum of parts liable to fail in use, which require negligible periodic adjustment or mechanical servicing and which are highly efficient in operation.

These and other objects of the invention will be apparent to those skilled in the art from the following detailed description of an embodiment thereof, when read in conjunction with the acompanying drawings, in which like reference numerals designate like parts and in which further:

FIGURE 2 represents a fragmentary elevation taken along line 2—2 of FIGURE 1 and partially cut away to show details of construction. Further, two positions of the nutating oven are shown, one being shown in phantom.

FIGURE 4 is an electro-mechanical schematic diagram of the controls and drives which may be used in connection with the embodiment of the invention shown.

Figure 1:
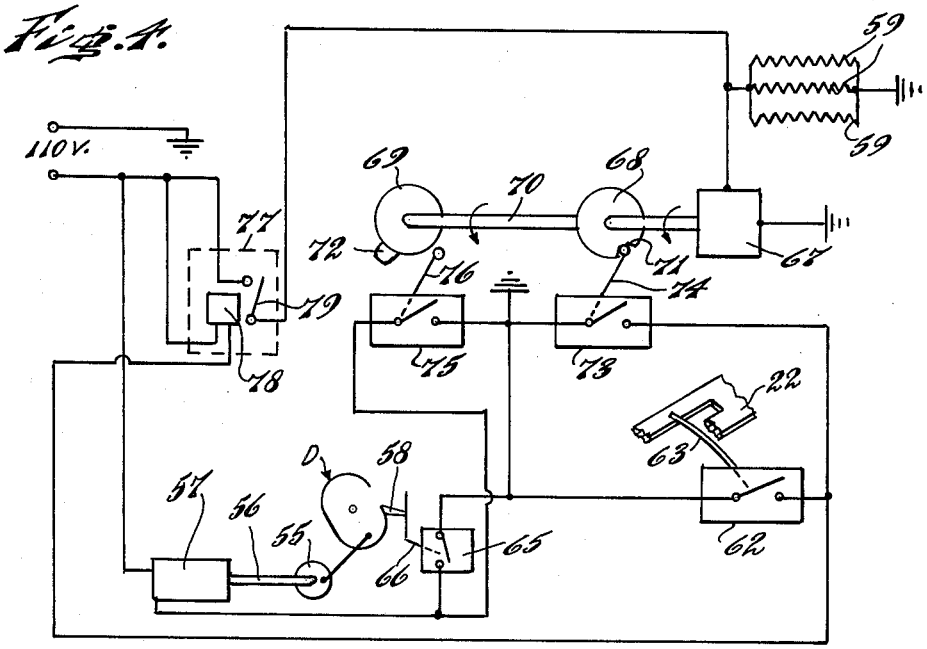
FIGURE 1 represents a top plan view of a dispenser embodying the invention, partially cut away to show details of construction.

Referring now to the drawings, wherein like numerals designate like parts, it will be observed that the dispenser comprises a housing A in which is removably mounted a frame B. On frame B are mounted the various elements of the dispensing mechanism including a magazine C and a nutating oven D as well as ancillary motor drives, controls and conveyor means.

The housing A, which is preferably fabricated of heavy sheet metal may be of any suitable shape to enclose the dispensing mechanism. Preferably it is parallelepipedal in shape and, as is customary in the vending machine art, may bear suitable advertising and instructional indicia. The housing includes a front wall 10, a rear wall 11, a left side wall 12, right side wall 13, and base 14. Mounted transversely within the housing A on base 14 is a longitudinally extending tongue-shaped guide 16 having anti-friction bearings 17, mounted outboard thereof.

Frame B is built upon a pair of longitudinally extending angle legs 20 and includes various components which may be in the form of separate weldments or formed, as by bending, from larger sheets of metal. These frame members include a magazine support 21, a first chute 22 having left side wall 23 and right side wall 24, and a second chute 25 which leads to the wall 10 of housing A. The entire frame may be provided with a left front side wall 26, a left rear side wall 27, a right front side wall 28 and a right rear side wall 29 and an anti-tampering strengtening baffle 30 mounted between walls 26 and 28. The entire frame B is mounted in registration over guide 16 and is supported by base 14. It may be easily removed in its entirety from housing A because of juxtaposition between rollers 17 and legs 20.

Verticaly extending gravity-feed magazine C is mounted on frame portion 21. The magazine has a cross-section which generally conforms to the containers for the articles being dispensed or to the articles themselves. In this embodiment the magazine includes a rear wall 21, including a baffle plate 32 proximate the point of magazine discharge, a left side wall 33 and a right side wall 34. The front of the magazine is formed of a left flange 35 and a right flange 36, which are spaced apart to permit observation and manipulation of the magazine's contents. The flanges are shouldered, as at 37 and 38 respectively, to increase the spacing between their edges opposite the rear discharge point.

The magazine is loaded with a plurality of articles 39 and has an internal cross section which conforms to their shape. It is preferred for purposes of sanitation and aesthetics to package the edible products in suitable airtight packages. Care must be used in the selection of materials used and the configuration of the boxes so that the subsequent heating in oven D will not damage the package but will, nonetheless, heat the contents in the desired manner. The stack of articles 39 feeds downwardly by gravity and this action may be enhanced by the provision of a weighted follower atop the stack. In the embodiment shown, the stack of articles is supported by shim blocks 40 which are mounted on support 21. These blocks allow for convenient manipulation of the stacked articles and also cooperate with the particular coin operated means for discharging edible articles from the magazine which is used in this particular embodiment. The discharge means comprises a ram 41 which is capable of manual reciprocation in a plane normal to the magazine. As shown in FIGURE 2, the ram acts directly on that article 39, which is at the bottom of the magazine, shoving it rearward. The ram is sized to slip between blocks 40 and shoulders 37 and 38 and has a width such that it will enter the magazine between the cut-back edges of flanges 35 and 39. Operating lever 42 is freed for one cycle of reciprocation by coin latch mechanism 43, details of which are not shown, since such mechanisms are well known to those skilled in the art. As the phrase "coin operated means for discharging an edible article from said magazine" is used henceforth herein it is intended to include not only simple, rugged, low cost means such as those just described (i.e. ram 41, etc.) but also more expensive and sophisticated equivalents. Such equivalents include, for example, a coin operated switch to activate a motor which causes a ram to penetrate the magazine and discharge of a single article. It must be emphasized that the embodiment shown is preferred because of its low cost and minimum number of motor operated functions. Yet, obviously, provision of such devices would be within the scope of the invention.

The nutating oven D is pivotally mounted on frame B as between a pair of brackets 50. As used herein a nutating oven is one which can, in effect, assume two positions—a first, article receiving position and a second, article discharging position. In embodiments of the invention such a nutating oven can thus perform both a heating and a material transfer function.

Oven D includes a generally arcuate reflective housing 51 provided with trunnions 52, which are pivotally retained by brackets 50. The housing is nutated by a crank 53, one end of which is attached to the housing 51 by a pivot arm 54. The other end of the crank is eccentrically pivoted on drive cam 55 which is mounted on shaft 56 of oven drive motor 57. Rotation of motor shaft 56 causes the oven to nutate between the two positions shown in FIGURE 2. The position shown in solid lines is the first or receiving position. The position shown in phantom is the second or discharge position and the corresponding crank positions. Housing 51 is also provided with a switch activating lug 58, and a plurality of internal electric heating elements 59 which may be located above and beneath a grille 60 having a cantilevered portion 61 extending toward the magazine C. In the embodiment shown, the entire oven (i.e. housing 51, heating elements 59, grille 60, etc.) moves but there is no reason why the reflector and heat source cannot be fixed and merely the grille moved from a position of receipt to a position of discharge to cause the oven, in effect, to nutate. The essence of the nutation concept, in connection with the invention, is the use of the oven structure, or a portion thereof, as a means for physically transferring articles being heated to thus obviate the necessity for separate conveyor means.

In the position shown in FIGURE 2 in heavy lines, the oven is in its first, receiving position. In this position, an article 39, discharged from magazine C by ram 41, slides down chute 22, onto grille extension 61 and into the housing 51 where its rests on grille 60. The article, as it is conveyed to the interior of the oven is guided by side walls 23 and 24. Further, baffle 32 insures its proper orientation. Extension 61 performs a conveying function just as does chute 22 and it is within the scope of the invention to elongate extension 61 to a point where it can directly receive articles discharged from the magazine to thus eliminate the need for a separate chute such as 22. Thus the means for conveying an edible article from the discharge point of the magazine to the interior of the oven may be partially associated with the oven structure and partially independent or totally associated with the oven structure.

Figure 3:
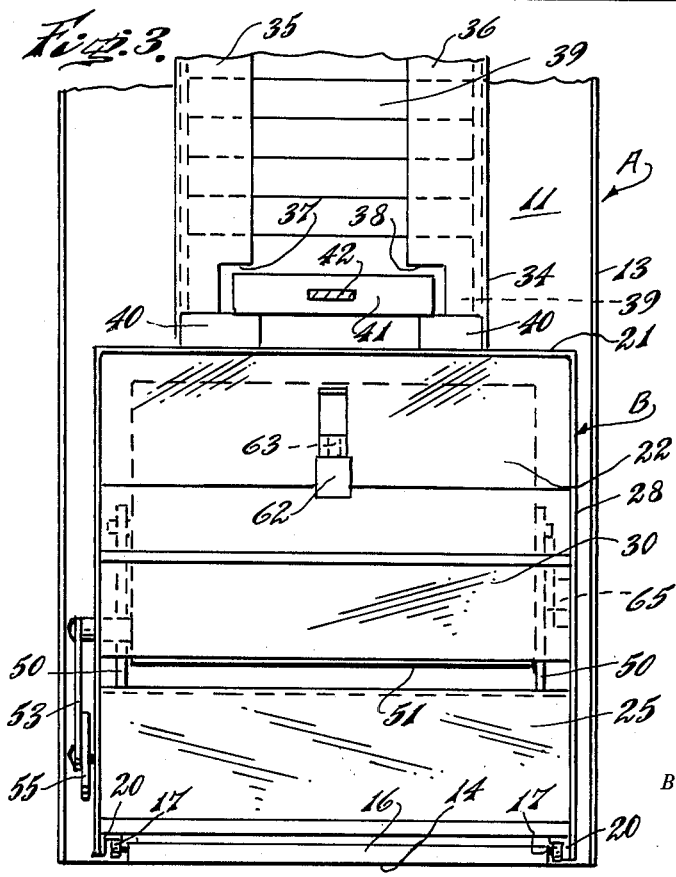
FIGURE 3 represents a partial front elevation of the embodiment shown in FIGURES 1 and 2 with the front removed to reveal interior construction.

An article travelling from magazine C to oven D activates a discharge detector switch 62 as by temporarily depressing switch arm 63. As shown in FIGURES 1 to 3 this switch may be mounted on frame B, as with bracket 64 in a position such that arm 63 protrudes through chute 22 so that an article moving past it activates the switch.

Also mounted on frame B is an oven motion detector switch 65 which has a switch arm 66. Arm 66 is held depressed by lug 58 in only one position, namely that shown in FIGURE 2.

The other control components are shown in FIGURE 4 and are mounted at convenient locations on frame B. These components include a cam motor 67, which drives a first cam 68 and a second cam 69 both of which may be mounted on a common motor shaft 70. Cam 68 is provided with a cut-out 71 and cam 69 is provided with an arcuate radial extension 72. A first cam switch 73, which is activated by a cam-following arm 74, is operatively associated with cam 68. A second cam switch 75, which is activated by a cam-following arm 76, is operatively associated with cam 69. A relay 77 is also provided which includes a coil 78 and normally-open contacts 79.

Operation of the machine is best understood with reference to FIGURE 4. An article discharged from the magazine passes down chute 22 and, as it passes over switch 62, depresses arm 63 to begin the control cycle. Article 39 continues onto grille extension 61 and thence to the interior of oven D where it rests on grille 60.

Switch 62 is normally open and its momentary closing allows current to flow through relay coil 78 to draw in normally-open contacts 79. This momentary energization is enough to permit flow of current through cam motor 67 and consequent small rotation of shaft 70 in the direction shown by the arrow. Such small rotation is sufficient to bring follower 74 out of cut-out 71 and to thus close normally-open switch 73. Since switches 62 and 73 are in parallel the net effect is that of a "hold circuit" which will keep cam motor 67 operating for one full revolution until follower arm 74 again rests in cut-out 71. At that time, which is about 15 seconds if motor 67 is a 4 r.p.m. motor, the circuit will open and contacts 79 drop out. All during this period when relay 77 is closed, energy is also being supplied to heating elements 59 and they will thus be on at the time that article 39 arrives at the interior of oven D.

So far nothing has been said of the means for nutating oven D in synchronism with the total dispensing action. Nutation is controlled by switches 65 and 75 which are wired in parallel. Switch 75 is normally-open. Switch 65, on the other hand, is normally-closed but, as shown in the solidly lined portion of FIGURE 2, is being held closed by the pressure of lug 58 on arm 66. At the start of rotation of shaft 70, neither switch is closed and, consequently, there is no motion of oven D. As shaft 70 continues to rotate, cam extension 72 depresses follower arm 76 and closes switch 75. The point in time after the beginning of rotation of shaft 70 is determined by the way cam 69 is cut and mounted but is sufficient to insure the presence within oven D of article 39. With the closing of switch 75, electricity flows to oven motor 57 so that shaft 56 and drive cam 55 turn. As a consequence, the action of crank 53 moves the oven toward the position shown in phantom in FIGURE 2. Early in oven motion, lug 58 loses contact with switch arm 66 so that switch 65 closes. Shortly thereafter, arm 76 loses contact with cam extension 72 so that continued oven rotation is totally controlled by switch 65 and will continue until lug 58 again contacts arm 66.

When oven D reaches its lower extreme of nutation, article 39 comes off the grille 60 and is transferred by gravity onto delivery chute 25. The oven continues to move back to its original position until switch 65 is closed and motor 57 ceases operation. While the same general effect would be achieved by extending the angular expanse of extension 72 and total elimination of switch 65, the method shown is preferred since more positive positioning of the oven at the end of the cycle is thus achieved.

Although the invention has been described in considerable detail, such description is intended to be illustrative rather than limiting, since the invention may be variously embodied. Its extent, consequently, is to be determined by the appended claims.

Having described my invention, I claim:

1. In a coin-operated dispenser for edible articles which benefit from heating immediately prior to their consumption; a nutating oven mounted for arcuate angular reciprocation of less than 180°, about an axis passing therethrough, between an upper article-receiving position and a lower article-dumping position, said oven including heaters; a magazine for storing edible articles; coin-operated means for discharging a single article at a time from said magazine; first chute means for slideably gravity delivering an article discharged from said magazine into the interior of said oven when said oven is in article-receiving position; switch means associated with said first chute means and activated by passage of an article thereon for turning on said heaters and causing said oven, after an article has been delivered thereinto, to move from article-receiving position to article-dumping position; second chute means adapted to slideably receive the heated article dumped from said oven; means to shut off said heaters when said oven reaches dumping position and means for returning said oven to article-receiving position to await discharge of another article from said magazine.

2. A dispenser for edible articles which benefit from heating immediately prior to consumption comprising a housing; a magazine for holding a plurality of edible articles located within said housing; coin operated means for discharging a single edible article at a time from said magazine; an oven within said housing mounted for arcuate nutation about its own transverse axis between an article receiving position and an article discharging position, said oven further including heating means and a grille for support of edible articles while they are being heated; first chute means for slideably gravity-conveying an edible article from said magazine onto said grille within said oven when said oven is in article-receiving position; second chute means for slideably receiving a heated article from said grille and gravity-conveying it to the exterior of said oven, when said oven is in article discharge position; means for causing said oven to be in article receiving position when an article is discharged from said magazine; means for activating said heaters when an article is slideably received onto said grille; means for de-activating said heaters when said oven has nutated to article-discharging position and means for returning said oven to article receiving position after discharge of a heated article therefrom.

References Cited by the Examiner

UNITED STATES PATENTS

| | | | |
|---|---|---|---|
| 1,951,746 | 3/1934 | Bonaccolta et al. | 221—150 |
| 2,094,016 | 9/1937 | Lampel | 219—389 |
| 2,831,419 | 4/1958 | Timm | 99—357 |
| 2,834,510 | 5/1958 | Cenotti | 221—150 |
| 2,841,074 | 7/1958 | Schechter | 99—357 |
| 2,950,024 | 8/1960 | Adler | 221—150 |
| 2,990,973 | 7/1961 | Chazen | 99—357 |

LOUIS J. DEMBO, *Primary Examiner.*

WALTER SOBIN, *Examiner.*